(12) United States Patent
Langford-Wood

(10) Patent No.: US 10,481,259 B2
(45) Date of Patent: Nov. 19, 2019

(54) TRACKING TARGETS ON A SONAR IMAGE

(71) Applicant: NAVICO HOLDING AS, Egersund (NO)

(72) Inventor: Robert Langford-Wood, Southampton (GB)

(73) Assignee: NAVICO HOLDING AS, Egersund (NO)

( * ) Notice: Subject to any disclaimer, the term of this patent is extended or adjusted under 35 U.S.C. 154(b) by 860 days.

(21) Appl. No.: 14/026,400

(22) Filed: Sep. 13, 2013

(65) Prior Publication Data

US 2015/0078122 A1 Mar. 19, 2015

(51) Int. Cl.
*G01S 15/66* (2006.01)

(52) U.S. Cl.
CPC ................................. *G01S 15/66* (2013.01)

(58) Field of Classification Search
None
See application file for complete search history.

(56) References Cited

U.S. PATENT DOCUMENTS

| | | | |
|---|---|---|---|
| 4,829,493 A | 5/1989 | Bailey | |
| 4,879,697 A | 11/1989 | Lowrance et al. | |
| 4,989,186 A | 1/1991 | Ricker | |
| 5,025,423 A | 6/1991 | Earp | |
| 5,191,341 A | 3/1993 | Gouard et al. | |
| 5,537,380 A | 7/1996 | Sprankle, Jr. et al. | |
| 5,805,528 A * | 9/1998 | Hamada | G01S 7/6227 367/111 |
| 6,225,984 B1 | 5/2001 | Crawford | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,761,692 B2 | 7/2004 | Angelsen et al. | |
| 6,816,782 B1 | 11/2004 | Walters et al. | |
| 7,002,579 B2 | 2/2006 | Olson | |
| 7,236,426 B2 | 6/2007 | Turner et al. | |
| 7,430,461 B1 | 9/2008 | Michaels | |
| 7,542,376 B1 * | 6/2009 | Thompson | G01S 15/89 367/104 |

(Continued)

FOREIGN PATENT DOCUMENTS

| | | | |
|---|---|---|---|
| JP | H 11-316277 A | 11/1999 | |
| WO | 2010-141011 A1 | 12/2010 | |
| WO | WO 2010141011 A1 * | 12/2010 | ........... G01S 15/025 |

OTHER PUBLICATIONS

PCT International Search Report and Written Opinion; PCT/IB2013/060285; dated Feb. 18, 2014.

(Continued)

*Primary Examiner* — Isam A Alsomiri
*Assistant Examiner* — Amie M Ndure
(74) *Attorney, Agent, or Firm* — Nelson Mullins Riley & Scarborough LLP

(57) ABSTRACT

Various implementations described herein are directed to a computer-implemented method for tracking one or more targets on a sonar image. The method may include displaying the sonar image on a computer screen, receiving a command to track the one or more targets on the sonar image, storing the locations of the one or more targets relative to a vessel and displaying a symbol around a respective one of the one or more targets.

16 Claims, 5 Drawing Sheets

(56) References Cited

U.S. PATENT DOCUMENTS

| | | | |
|---|---|---|---|
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 2002/0035574 A1 | 3/2002 | Dumas | |
| 2002/0093541 A1 | 7/2002 | Schileru-Key | |
| 2003/0202426 A1* | 10/2003 | Ishihara | G01S 15/96 367/103 |
| 2004/0076330 A1* | 4/2004 | Sloan | G06K 9/3241 382/228 |
| 2004/0193364 A1 | 9/2004 | Chojnacki | |
| 2005/0033173 A1* | 2/2005 | Von Behren | A61B 8/00 600/443 |
| 2005/0099887 A1* | 5/2005 | Zimmerman | G01S 7/52003 367/12 |
| 2005/0102101 A1 | 5/2005 | Beesley et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2006/0280030 A1* | 12/2006 | Makris | G01S 7/52004 367/11 |
| 2008/0126935 A1 | 5/2008 | Blomgren | |
| 2008/0204424 A1 | 8/2008 | Jin et al. | |
| 2009/0064055 A1 | 3/2009 | Chaudhri et al. | |
| 2009/0099871 A1 | 4/2009 | Gadodia | |
| 2009/0179789 A1 | 7/2009 | Haughay, Jr. et al. | |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0145601 A1 | 6/2010 | Kurtti et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2011/0013484 A1 | 1/2011 | Coleman et al. | |
| 2011/0013485 A1* | 1/2011 | Maguire | G01S 15/89 367/88 |
| 2011/0019887 A1 | 1/2011 | Roehrig et al. | |
| 2011/0025720 A1 | 2/2011 | Jo et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0185801 A1 | 7/2012 | Madonna et al. | |
| 2013/0007665 A1 | 1/2013 | Chaudhri et al. | |
| 2013/0148471 A1* | 6/2013 | Brown | G01S 15/8902 367/88 |
| 2013/0215719 A1* | 8/2013 | Betts | G01S 7/521 367/88 |
| 2015/0369908 A1* | 12/2015 | Zimmerman | G01S 15/96 367/7 |

OTHER PUBLICATIONS

PCT International Search Report and Written Opinion; PCT/US2013/047869; dated Oct. 21, 2013.
PCT International Search Report and Written Opinion; PCT/US2013/048177; dated Oct. 21, 2013.
PCT International Search Report and Written Opinion; PCT/US2013/048129; dated Oct. 17, 2013.
PCT International Search Report and Written Opinion; PCT/US2013/047926; dated Oct. 11, 2013.
PCT International Search Report and Written Opinion; PCT/US2013/047645; dated Sep. 27, 2013.
PCT International Search Report and Written Opinion; PCT/IB2014/064409; dated Jan. 20, 2015.
Hossein Peyvandi, Mehdi Farrokhrooz, Hossein Roufarshbaf and Sung-Joon Park(2011). Sonar Systems and Underwater Signal Processing: Classic and Modern Approaches, Sonar Systems, Prof. Nikolai Kolev (Ed.), InTech, DOI: 10.5772/17505. Available from: https://www.intechopen.com/books/sonar-systems/sonar-systems-and-underwater-signal-processing-classic-and-modern-approaches.
International Search Report and Written Opinion for International Application No. PCT/IB2014/064409 dated Jan. 20, 2015, all enclosed pages cited.

* cited by examiner

TRACKING TARGETS ON A SONAR IMAGE

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar has been used to detect waterborne or underwater objects. For example, sonar devices may be used to determine depth and bottom topography, detect fish or other waterborne contacts, or locate wreckage. Devices such as transducer elements, or transducers, have been developed to produce sound at a particular frequency. These transducer elements may transmit the sound into and through the water, and they may also detect echo returns from sound that return to the transducer elements after reflecting off of an object.

Transducer elements may convert an electrical signal into sound energy and, conversely, may convert sound energy, detected via pressure changes, into an electrical signal. In operation, a transducer element may produce a sound pressure signal which emanates in a beam pattern such that a pressure wave is generated, where the pressure wave expands as it moves away from the source. Reflected sound may then return to the transducer element in the form of a sonar return signal, where the sonar return signal may be interpreted as a surface of an object. Such transducer elements may be directed in various directions from surface or submersible vessels to locate other vessels, or the transducer elements may be directed towards the seabed for navigation and/or target location. In one example, transducer elements may be constructed using piezoelectric material. Display technology may also be utilized in the interpretation of sonar data representing the sonar return signals, such as through liquid crystal displays (LCDs) or other digital displays. To identify objects within water, a sonar system may use one or more transducer elements, where a transmitting element may be used to transmit electrical signals to the transducer elements in order to produce sound energy into and through the water. In one scenario, the sonar system may use a plurality of transmitting elements in order to transmit electrical signals of varying frequencies to the transducer elements.

Some sonar systems, called 360 degree sonar systems, use either a multitude of transducers oriented in several directions around the sonar system, or one or more transducers swept in a 360 degree arc around the sonar system. The 360 degree sonar systems provide more information than standard sonar systems because sonar information is collected from all around the sonar system.

The sonar images generated by the sonar systems may be displayed to an operator. The sonar images may be difficult to decipher, depending on the properties of the water, the contents of the water, and other factors. This may present a problem for navigation as the vessel moves through the water because it may be difficult for an operator of the vessel to distinguish and keep track of multiple nearby objects that move relative to the vessel.

SUMMARY

Various implementations described herein are directed to a computer-implemented method for tracking one or more targets on a sonar image. The method may include displaying the sonar image on a computer screen, receiving a command to track the one or more targets on the sonar image, storing the locations of the one or more targets relative to a vessel and displaying a symbol around a respective one of the one or more targets.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
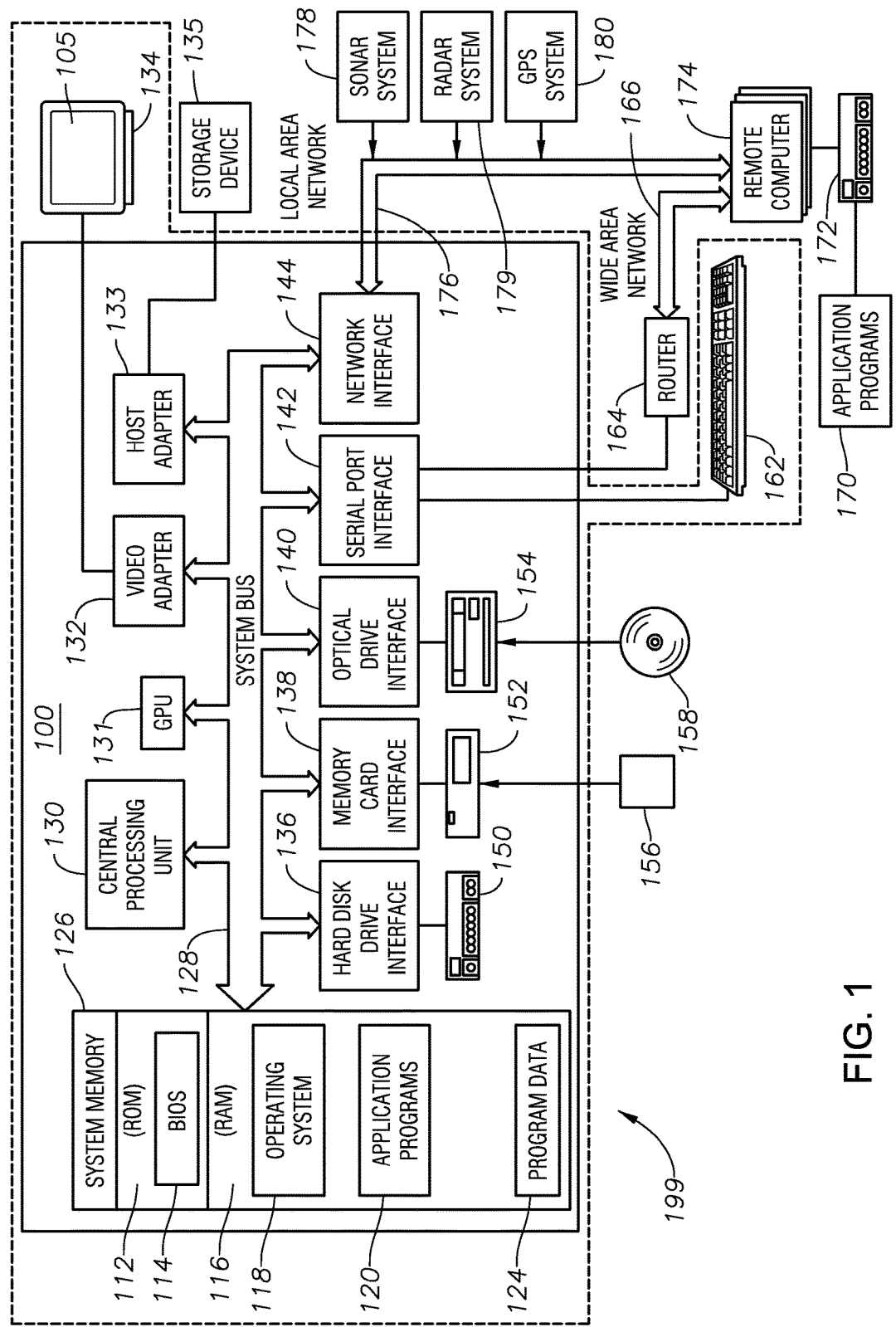
FIG. 1 is a block diagram of a multi-function display and various components contained therein in accordance with implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

The following paragraph provides a brief summary of various implementations described herein. Various techniques and technologies described herein may be implemented on a marine vessel equipped with a 360 degree sonar system. In one implementation, a multi-function display (MFD) displays a sonar image on a display. The sonar image may be generated by the 360 degree sonar system. The MFD may receive a command to track one or more targets on the sonar image. In one implementation, the command and the one or more targets are received from an operator. In response, the MFD may determine whether the color contrast between the one or more targets and the sonar image background exceeds a predetermined value. If so, the targets are then tracked. In another implementation, upon receiving the command, one or more possible targets are identified by the MFD and displayed on the MFD. The operator may then select a portion of the possible targets. In either implementation, the MFD may display a symbol around the one or more targets. The symbol may be an outline of a geometric shape, e.g., a triangle.

Multi-Function Display

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

FIG. 1 illustrates a schematic diagram of a multi-function display 199 having a computing system 100 in which the various technologies described herein may be incorporated and practiced. The computing system 100 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 100 may include a central processing unit (CPU) 130, a system memory 126, a graphics processing unit (GPU) 131 and a system bus 128 that couples various system components including the system memory 126 to the CPU 130. Although only one CPU 130 is illustrated in FIG. 1, it should be understood that in some implementations the computing system 100 may include more than one CPU 130.

The CPU 130 can include a microprocessor, a microcontroller, a processor, a programmable integrated circuit, or a combination thereof. The CPU 130 can comprise an off-the-shelf processor such as a Reduced Instruction Set Computer (RISC™), or a Microprocessor without Interlocked Pipeline Stages (MIPS™) processor, or a combination thereof. The CPU 130 may also include a proprietary processor.

The GPU 131 may be a microprocessor specifically designed to manipulate and implement computer graphics. The CPU 130 may offload work to the GPU 131. The GPU 131 may have its own graphics memory, and/or may have access to a portion of the system memory 126. As with the CPU 130, the GPU 131 may include one or more processing units, and each processing unit may include one or more cores.

The CPU 130 may provide output data to a GPU 131. The GPU 131 may generate graphical user interfaces that present the output data. The GPU 131 may also provide objects, such as menus, in the graphical user interface. A user may provide inputs by interacting with the objects. The GPU 131 may receive the inputs from interaction with the objects and provide the inputs to the CPU 130. A video adapter 132 may be provided to convert graphical data into signals for a monitor 134. The monitor 134 includes a display 105. The display 105 may be a touch screen. A touch screen can be sensitive to heat or touching (now collectively referred to as a "touch screen").

The system bus 128 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 126 may include a read only memory (ROM) 112 and a random access memory (RAM) 116. A basic input/output system (BIOS) 114, containing the basic routines that help transfer information between elements within the computing system 100, such as during start-up, may be stored in the ROM 112.

The computing system 100 may further include a hard disk drive interface 136 for reading from and writing to a hard disk 150, a memory card reader 152 for reading from and writing to a removable memory card 156, and an optical disk drive 154 for reading from and writing to a removable optical disk 158, such as a CD ROM or other optical media. The hard disk 150, the memory card reader 152, and the optical disk drive 154 may be connected to the system bus 128 by a hard disk drive interface 136, a memory card reader interface 138, and an optical drive interface 140, respectively. The drives and their associated computer-readable media may provide nonvolatile storage of computer-readable instructions, data structures, program modules and other data for the computing system 100.

Although the computing system 100 is described herein as having a hard disk, a removable memory card 156 and a removable optical disk 158, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 100 may also include a host adapter 133 that connects to a storage device 135 via a small computer system interface (SCSI) bus, a Fiber Channel bus, an eSATA bus, or using any other applicable computer bus interface. The computing system 100 can also be connected to a router 164 to establish a wide area network (WAN) 166 with one or more remote computers 174. The remote computers 174 can also include hard disks 172 that store application programs 170.

In certain implementations, various techniques, including the flow diagram, described herein can be implemented by a plurality of executable instructions stored in RAM. Alternatively, the plurality of executable instruction can be stored in the hard disk 150, or removable computer-readable media such as memory card 156 or optical media 158 until needed for execution.

A number of program modules may be stored on the hard disk 150, memory card 156, optical disk 158, ROM 112 or RAM 116, including an operating system 118, one or more application programs 120, and program data 124. The application programs 120 may include various mobile applications ("apps") and other applications configured to perform various methods and techniques described herein. The operating system 118 may be any suitable operating system that may control the operation of a networked personal or server computer.

An operator may enter commands and information into the computing system 100 through input devices such as buttons 162. Other input devices may include a microphone (not shown) or through the display 105 if it is a touch screen. These and other input devices may be connected to the CPU 130 through a serial port interface 142 coupled to system bus 128, but may be connected by other interfaces, such as a parallel port, game port or a universal serial bus (USB).

Certain implementations may be configured to be connected to a sonar system 178, radar interface 179, and GPS system 180. The sonar system 178, radar interface 179, and GPS system 180 may be connected via the network interface 144. The computing system 100, the monitor 134, the display 105, and the buttons 162 may be integrated into a console, forming a multi-function display ("MFD") 199.

Tracking Targets

Figure 2:
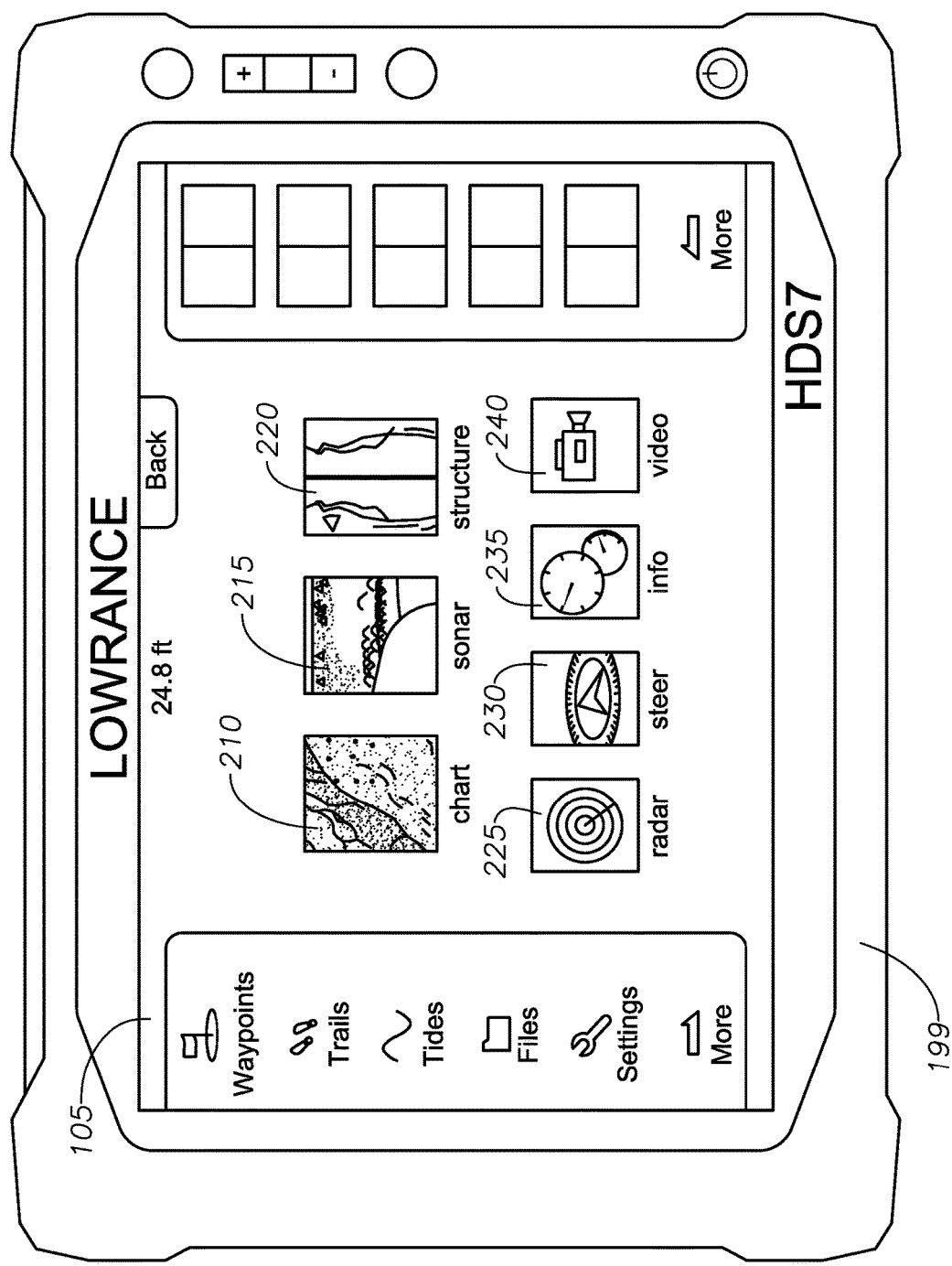
FIG. 2 illustrates a schematic diagram of a multi-function display in accordance with implementations described herein.

FIG. 2 illustrates the multi-function display 199 in accordance with implementations described herein. The MFD 199 includes the display 105. The display 105 may be a touch-screen for operator input, or the MFD 100 may be equipped with other input devices, such as a mouse or keyboard (not shown). The display 105 may display icons 210-240 to provide the operator with a selection of options and programs available on the MFD 199. When selected, icon 210 may cause the MFD 199 to display navigation charts on display 105. The navigation chart may be made up of a number of layers, each containing different types of navigation data.

The terms "overlay" and "layer" in the context of navigation charts may be used interchangeably. Computer displayed navigation charts are typically made up of layers, each of which may or may not be displayed based on the operator's preference. The base layer is typically a geographical map showing water and land. Each layer has a different type of geographically referenced information contained in it. For example, one layer may contain radar data from near the vessel, while another layer may contain sonar data from beneath the vessel. Since the two would overlap on a navigation chart, an operator may choose to display only one of these layers at a time or both at the same time.

Selection of icon 215 may cause the MFD 199 to display sonar information on display 105. The sonar information may include 360 degree sonar images. Selection of icon 215 may also cause the MFD 199 to begin process 400 or 500 or allow the operator to select between the two processes. Selection of icon 220 may cause the MFD 199 to display data regarding geological structure on display 105. Selection of icon 225 may cause the MFD 199 to display radar information on display 105. Selection of icon 230 may cause the MFD 199 to display steering information such as current bearing or latitude and longitude coordinates on display 105. Selection of icon 235 may cause the MFD 199 to display configuration information on display 105. Selection of icon 240 may cause the MFD 199 to provide options to record or view video on display 105.

Figure 3:
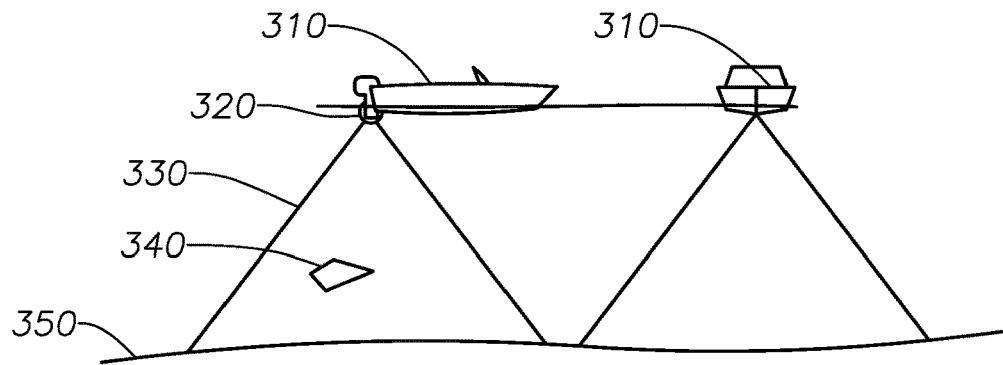
FIG. 3 illustrates a schematic diagram of a vessel with a 360 degree sonar system, producing an image of a water column below the vessel in accordance with implementations described herein.

FIG. 3 illustrates a schematic diagram of a vessel 310 equipped with a sonar imaging system 320 in connection with various implementations described herein. The sonar imaging system 320 may be a 360 degree sonar imaging system. A 360 degree sonar imaging system sweeps transducers in a wide pattern, causing the resulting sonar image to represent a large area all around the vessel. The sonar imaging system 320 may have one or more transducers (not shown), which produce acoustic signals in the area 330 that reflect off object 340 and the sea floor 350. The reflections from the acoustic signals return to the transducers and are recorded by the transducers in terms of signal amplitude and delay time. The delay time is the time between when the acoustic signal is generated and when the reflection signal is recorded. Thus, the recorded reflection signals contain information about the distance between the sonar system 320 and the object 340. Shorter delay time and larger signal amplitude correspond to less distance between the sonar system 320 and the object 340. Longer delay time and smaller signal amplitude correspond to more distance between the sonar system 320 and the object 340.

Figure 6:
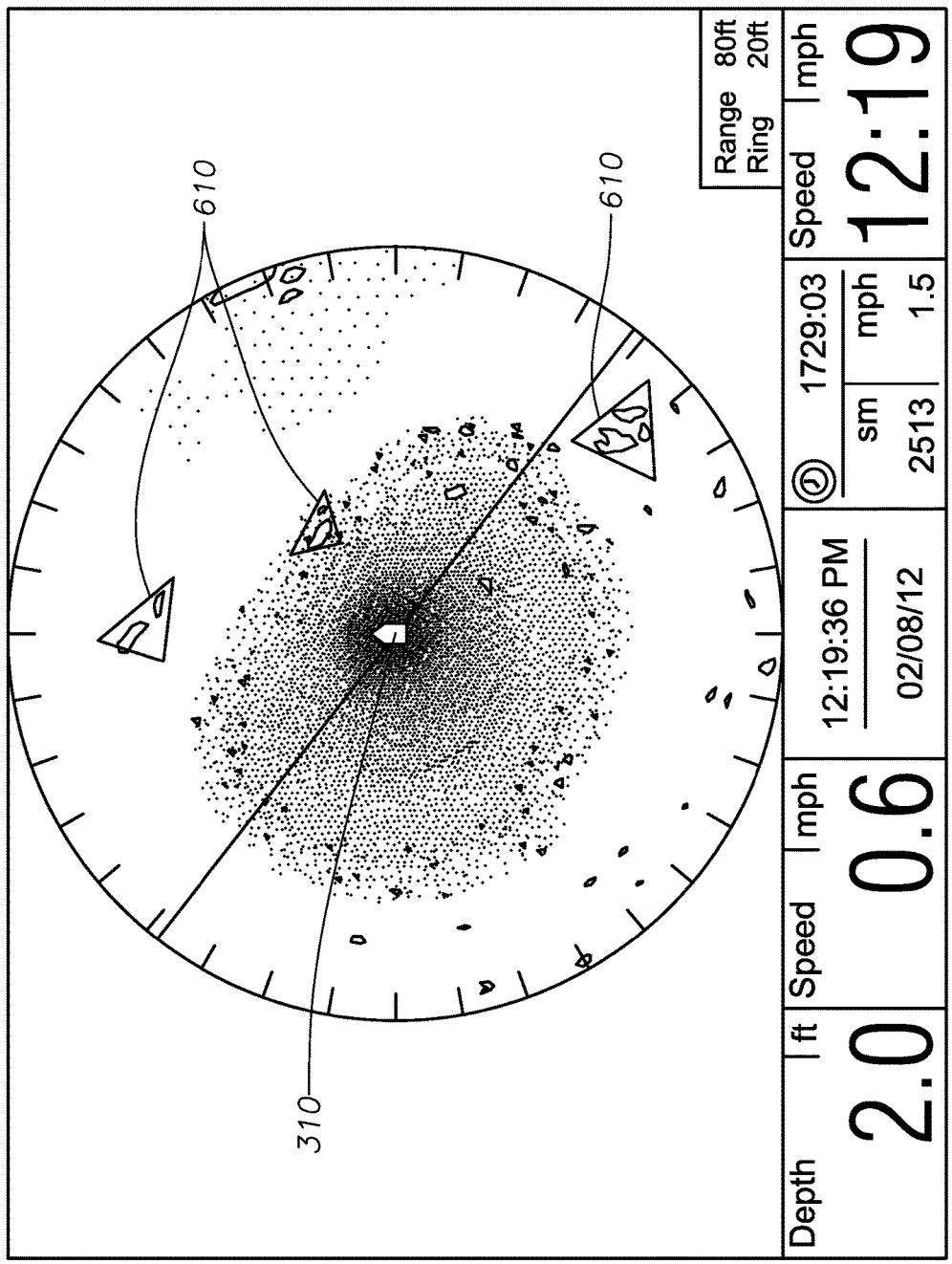
FIG. 6 illustrates a sonar image showing tracked targets in accordance with implementations described herein.

The information contained in the recorded reflection signals may be used to create a sonar image, an example of which is shown in FIG. 6. Each pixel of the sonar image, which is a digital image, may use the signal amplitude and delay time data to set the color value of the pixel. The color value may depend on the desired color scheme of the sonar image. For example, in a black-and-white implementation, a pixel which corresponds to a large signal amplitude and short delay time may be white or almost white. A pixel which corresponds to a low signal amplitude and long delay time may be almost black. A pixel which corresponds to no return signal at all may be black. Other color schemes may be implemented in a similar manner. In one implementation, the sonar image represents, by use of color contrast, distance from the sonar system.

Figure 4:
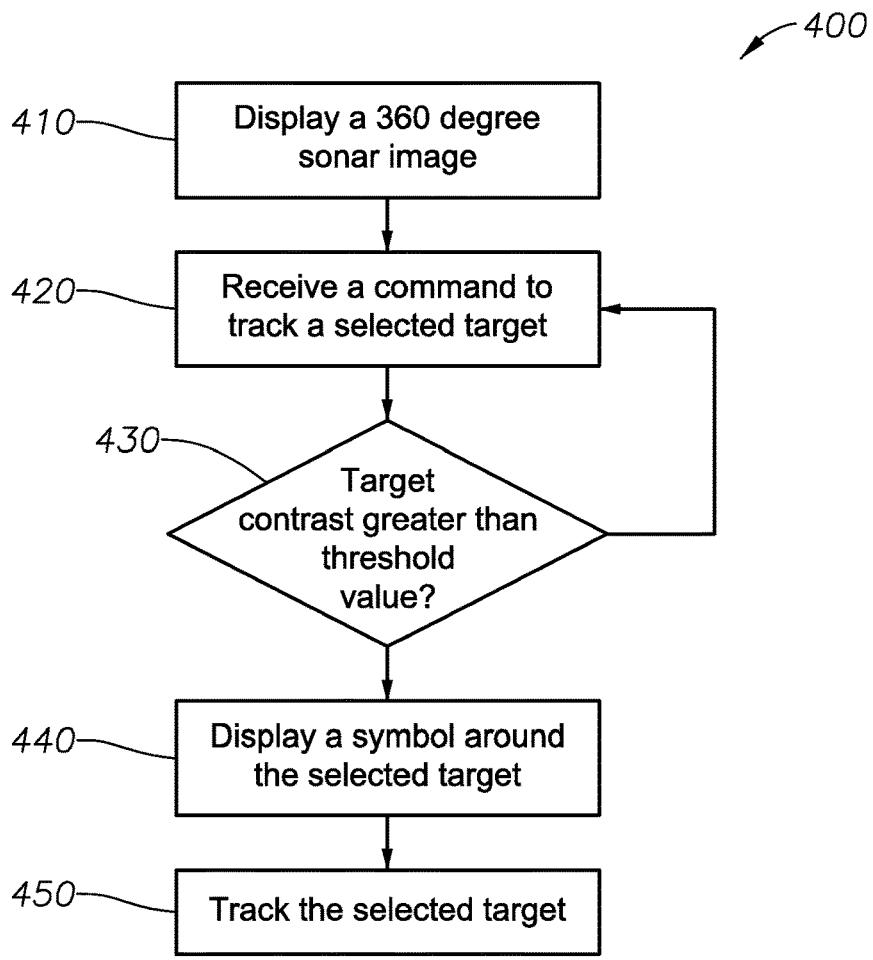
FIG. 4 is a flow diagram for selecting a target to track on a sonar image in accordance with implementations described herein.

FIG. 4 illustrates a method 400 for tracking a selected target on a sonar image in accordance with implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 410, the MFD 199 displays a sonar image on display 105. The sonar image may be created from data recorded by a 360 degree sonar system attached to the underside of the vessel. The sonar image may be created as described above regarding FIG. 3.

At step 420, the MFD 199 receives a command from the operator to track a selected target. The operator may input the command using any input device connected to the MFD 199, such as a touch screen or mouse. The command to track a selected target may include two steps. First, the MFD 199 may receive a location on the sonar image. In one implementation, the location is with respect to the sonar image itself, and is in terms of pixel coordinates. The location corresponds to the selected target, and may be received by an operator touching a touchscreen displaying the sonar image. Second, the MFD 199 may receive a command to track the selected target. This command may be received by an operator clicking or touching an icon displayed on the MFD 199.

After the operator selects a target, at step 430, a determination is made as to whether the color contrast of the selected target with respect to the sonar image background is greater than a predetermined threshold value. The color contrast of a pixel in the sonar image may be the difference between the color value of the pixel and the color value of the sonar image background. Since the received location of the target may be in terms of pixel coordinates of a single pixel on the sonar image, the color contrast of the entire target may be calculated by summing the color contrasts of pixels near the location of the target. Pixels near the location of the target may be pixels within a predetermined minimum area around the target. For example, the color contrast of the entire target may be calculated by summing all the color contrasts of pixels within a ten-pixel radius of the target's location. The color contrast of the target is then compared to the predetermined threshold value. Both the predetermined threshold value and the predetermined minimum area may be stored in the memory of the computing system 100. At step 430, if the target does not have greater color contrast than the predetermined threshold value, then method 400 returns to step 420 to receive a new target. If the target does have greater color contrast than the predetermined threshold value, the method 400 proceeds to step 440. The color contrast of a pixel may be calculated directly from the recorded sonar data, rather than the color values of the pixel and the sonar image.

The MFD 199 may use other parameters to determine whether or not a selected target can be tracked. The MFD 199 may use shape, size, speed, or other parameters to verify whether the target is suitable. The various parameters may be applied on the area surrounding the location of the target on the sonar image using any recognition algorithm known in the art. For example, a shape recognition algorithm may compare all the pixels of the sonar image in a predetermined area surrounding the location of the target to a predetermined shape pattern. If the color values of the sonar image pixels and the color values of the predetermined shape pattern are similar, then the target is a match, and can therefore be tracked.

At step 440, the MFD 199 displays a symbol around the selected target on display 105. This symbol may be displayed as an overlay on the sonar image previously displayed. One purpose of displaying this symbol is to allow the operator to easily view the tracked target. It may be easier to quickly determine the location of a target if there is a symbol displayed around the target. The symbol may be an outline of a geometric shape, such as a triangle, circle, square and the like.

At step 450, the computing system 100 tracks the selected target. Tracking the target may involve storing its location relative to the vessel. As the target moves relative to the vessel, the location continues to be stored. In this manner, the MFD 199 continuously stores the current location of the target. The MFD 199 may also store the location of the target relative to the earth. This may be accomplished by using a global positioning system (GPS) on board the vessel, or by other means of determining real-world coordinates of the vessel. In one implementation, the MFD 199 may use the stored location of the target to control an autopilot system, which may be used to control the steering of the vessel. In this manner, the MFD 199 may cause the vessel to follow the target. In another implementation, the MFD 199 may use the stored location of the target to assist the operator in steering the vessel, by displaying a generated route that follows the target on display 105, or by course correction, or by other means. In yet another implementation, the MFD 199 may display a warning when the target enters a guard zone. The guard zone is a two dimensional area of physical space, the coordinates and dimensions of which are stored in the memory of the computing system 100. The guard zone may be previously set up by the operator. Set up of a guard zone may involve the MFD 199 receiving the location and dimensions of the guard zone from the operator. For example, if an operator has set up a circular guard zone around the vessel and a tracked target enters the guard zone, the MFD 199 may display a warning, alerting the operator to a nearby target.

Method 400 may be repeated as many times as desired to track any number of targets. The computing system 100 may store a list of tracked targets, and every iteration of method 400 adds a new target to the list.

Figure 5:
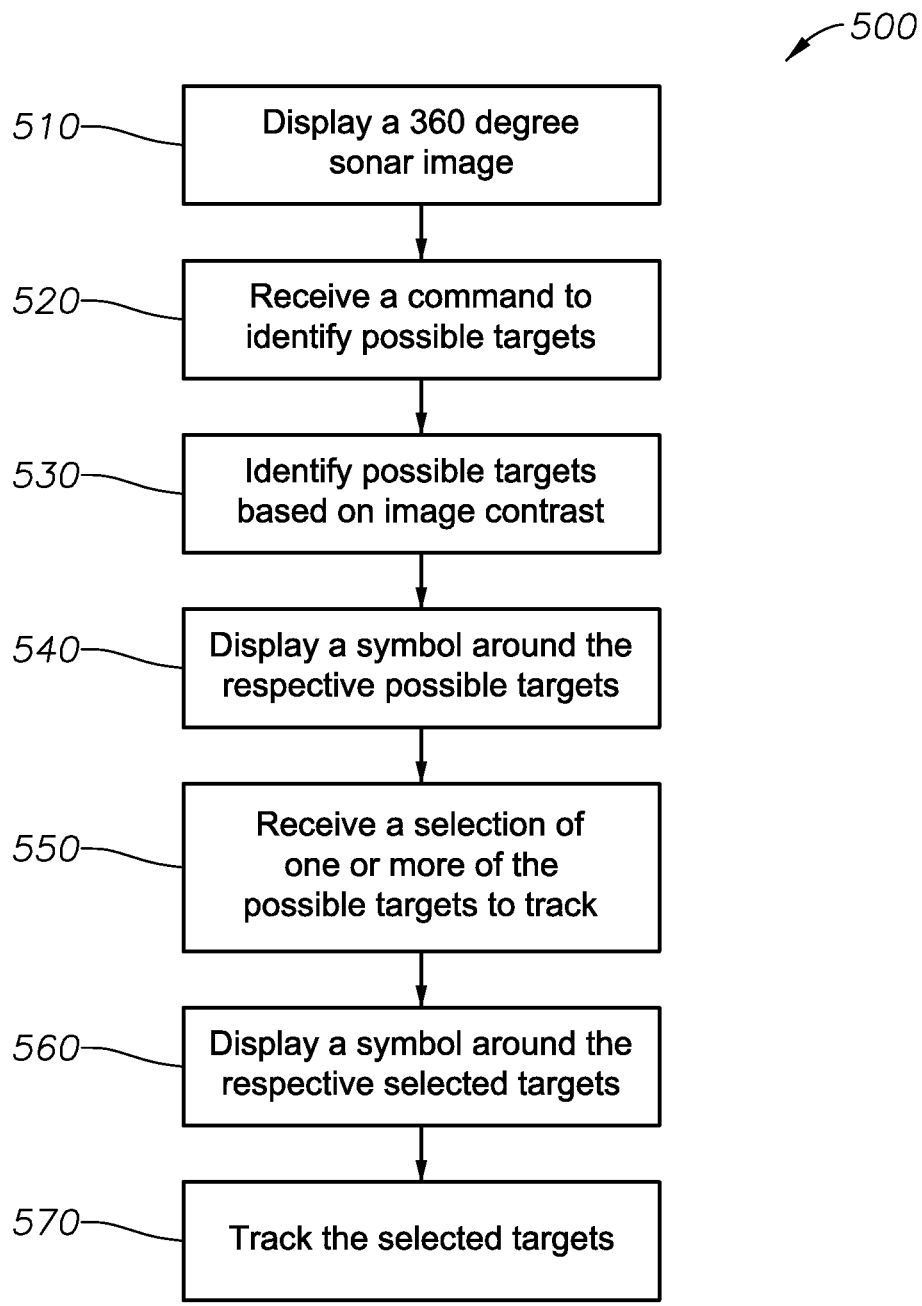
FIG. 5 is a flow diagram for selecting possible targets to track on a sonar image in accordance with implementations described herein.

FIG. 5 illustrates method 500 for automatically tracking one or more targets in accordance with implementations described herein. It should be understood that while the operational flow diagram indicates a particular order of execution of the operations, in other implementations, the operations might be executed in a different order. Further, in some implementations, additional operations or steps may be added to the method. Likewise, some operations or steps may be omitted.

At step 510, the MFD 199 displays a sonar image on display 105. The sonar image may be created from data recorded by a 360 degree sonar system attached to the underside of the vessel. The sonar image may be created as described above regarding FIG. 3.

At step 520, the MFD 199 receives a command to identify possible targets. The operator may input this command using any input device connected to the MFD 199. In one implementation, the operator may click or touch an icon to command the MFD 199 to identify possible targets.

At step 530, the MFD 199 identifies the possible targets. Identifying possible targets may involve processing the sonar image to determine which locations on the sonar image have greater color contrast (as compared to the sonar image background) than a predetermined threshold value. The processing may involve iterating through every pixel in the sonar image, performing any known recognition algorithm. The predetermined threshold value may be stored in the memory of the computing system 100. In this manner, targets are identified that can be correctly tracked.

The MFD 199 may also use other parameters to identify possible targets. Those parameters include shape, size, speed, color, and the like. The MFD 199 may use recognition algorithms along with these parameters to identify the possible targets.

At step 540, the MFD 199 displays a symbol around the respective identified targets. The symbols may be overlaid on the sonar image previously displayed. One purpose of displaying the symbols is to allow the operator to view the identified targets. It may be easier to quickly determine the location of a target if there is a bright symbol displayed around the target. The symbol may be an outline of a geometric shape, such as a triangle.

At step 550, the MFD 199 may receive a selection of one or more of the identified targets to track from the operator. The selection may include all the targets. The operator may input the selection by touching, on a touchscreen, every target that the operator wishes to track. The operator may also use other input devices, e.g., a mouse, to indicate which targets to track. The MFD 199 may also display an icon for selecting all the targets, which may cause the MFD 199 to select all the targets if touched or clicked by the operator.

At step 560, the MFD 199 displays a symbol around the respective selected targets. The symbols may be overlaid on the sonar image previously displayed. One purpose of displaying the symbols is to allow the operator to view the selected targets to be tracked. It may be easier to quickly determine the location of a target if there is a bright symbol displayed around the target. The symbol may be an outline of a geometric shape, such as a triangle. At step 560, the MFD 199 may also stop displaying symbols displayed by step 540 around the identified targets.

At step 570, the computing system 100 tracks the selected targets. Tracking the targets may involve storing their locations relative to the vessel. As the targets move relative to the vessel, the locations continue to be stored. In this manner, the MFD 199 continuously stores the current locations of the targets. The MFD 199 may also store the location of the target relative to the earth. This may be accomplished by using a GPS on board the vessel, or by other means of determining real-world coordinates of the vessel. In one implementation, the MFD 199 may use the stored locations of the targets to control an autopilot system. The autopilot system controls the steering of the vessel. In this manner, the MFD 199 may cause the vessel to follow one or more of the targets. In another implementation, the MFD 199 may use the stored locations of the targets to assist the operator in steering the vessel, by displaying a generated route that follows one or more of the targets on display 105, or by course correction, or by other means. In yet another implementation, the MFD 199 may display a warning when any target enters a guard zone.

FIG. 6 illustrates a sonar image with tracked targets 610 in accordance with implementations described herein. The targets 610 may be set up either by method 400 or by method 500. Since there are three targets 610, the manual method 400 of tracking targets may be executed three times in order to acquire all three targets. The automatic method 500 of tracking targets may only be executed once, since method 500 identifies any possible targets. The sonar image may be centered on the vessel 310, since the sonar system is attached to the vessel 310. The targets 610 have white triangles around them, corresponding to the symbols displayed in methods 400 and 500.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for tracking one or more targets on a sonar image, the method comprising:
    receiving first sonar data from a sonar system of a vessel at a first time, wherein the first sonar data is generated from a plurality of sonar returns from an underwater environment relative to the vessel based on a first sweep of the underwater environment by the sonar system, wherein at least one transducer of the sonar system is configured to mechanically rotate 360 degrees during the first sweep;
    processing the first sonar data from the first sweep to form a first sonar image that shows a representative plan view of the underwater environment relative to the vessel, wherein the first sonar image is formed using pixel coordinates for each of the plurality of sonar returns of the first sonar data, wherein each pixel coordinate defines a color value that directly correlates to at least an amplitude of a corresponding sonar return;
    displaying the first sonar image on a computer screen;
    identifying one or more targets in the first sonar image by determining that a contrast between the color value of one or more pixel coordinates of the first sonar image and a background color value of the first sonar image is greater than a predetermined threshold;
    receiving user input to a user interface associated with the screen, wherein the user input indicates a desire to track the one or more targets on the first sonar image;
    determining a first location of the one or more targets based on the pixel coordinates of the first sonar image associated with the one or more targets;
    receiving second sonar data from the sonar system of the vessel at a second time following the first time, wherein the second sonar data is generated from a plurality of sonar returns from the underwater environment relative to the vessel based on a second sweep of the underwater environment by the sonar system, wherein the at least one transducer of the sonar system is configured to mechanically rotate 360 degrees during the second sweep;
    processing the second sonar data from the second sweep to form a second sonar image that shows a representative plan view of the underwater environment relative to the vessel, wherein the second sonar image is formed using pixel coordinates for each of the plurality of sonar returns of the second sonar data, wherein each pixel coordinate defines a color value that directly correlates to at least an amplitude of a corresponding sonar return;
    displaying the second sonar image on the computer screen;
    re-identifying the one or more targets within the second sonar image based on at least a contrast between the color value of one or more pixel coordinates of the second sonar image and a background color value of the second sonar image by identifying at least one of shape, size, color, or speed associated with one or more pixel coordinates that substantially matches one or more predetermined shapes, speeds, colors or sizes of the one or more targets;
    determining a second location of the one or more targets based on the pixel coordinates of the second sonar image associated with the one or more targets; and
    tracking the one or more targets by at least storing the first location and the second location of the one or more targets in a memory.

2. The method of claim 1, further comprising:
    displaying a first symbol around each of the identified one or more targets in the first sonar image; and
    displaying the same symbol around each of the corresponding identified one or more targets in the second sonar image.

3. The method of claim 2, wherein the symbol is an outline of a geometric shape.

4. The method of claim 1, wherein receiving the user input comprises receiving a selection of one or more pixel coordinates in the first sonar image.

5. The method of claim 4, wherein receiving the user input occurs prior to identifying the one or more targets.

6. The method of claim 1, further comprising steering the vessel toward the one or more targets.

7. The method of claim 6, wherein the vessel is steered by an autopilot system.

8. The method of claim 1, further comprising:
    comparing the second location of the one or more targets to one or more guard zones relative to the vessel; and
    providing, via the user interface, a warning in an instance in which the second location is within the one or more guard zones such that the one or more targets has entered at least one of the one or more guard zones.

9. The method of claim 1, wherein determining the first location comprises determining the first location relative to the earth, and wherein determining the second location comprises determining the second location relative to the earth.

10. The method of claim 1, wherein identifying the one or more targets comprises summing the contrasts of a plurality of pixel coordinates that are each within a predetermined minimum area.

11. A non-transitory computer-readable medium having stored thereon computer-executable instructions which, when executed by a computer, cause the computer to:
    receive first sonar data from a sonar system of a vessel at a first time, wherein the first sonar data is generated from a plurality of sonar returns from an underwater environment relative to the vessel based on a first sweep of the underwater environment by the sonar system, wherein at least one transducer of the sonar system is configured to mechanically rotate 360 degrees during the first sweep;
    process the first sonar data from the first sweep to form a first sonar image that shows a representative plan view of the underwater environment relative to the vessel, wherein the first sonar image is formed using pixel coordinates for each of the plurality of sonar returns of the first sonar data, wherein each pixel coordinate defines a color value that directly correlates to at least an amplitude of a corresponding sonar return;
    display a first sonar image on a computer screen;
    identify one or more targets in the first sonar image by determining that a contrast between the color value of one or more pixel coordinates of the first sonar image and a background color value of the first sonar image is greater than a predetermined threshold;

receive user input to a user interface associated with the screen, wherein the user input indicates a desire to track one or more targets on the first sonar image;

determine a first location of the one or more targets based on the pixel coordinates of the first sonar image associated with the one or more targets;

receive second sonar data from the sonar system of the vessel at a second time following the first time, wherein the second sonar data is generated from a plurality of sonar returns from the underwater environment relative to the vessel based on a second sweep of the underwater environment by the sonar system, wherein the at least one transducer of the sonar system is configured to mechanically rotate 360 degrees during the second sweep;

process the second sonar data from the second sweep to form a second sonar image that shows a representative plan view of the underwater environment relative to the vessel, wherein the second sonar image is formed using pixel coordinates for each of the plurality of sonar returns of the second sonar data, wherein each pixel coordinate defines a color value that directly correlates to at least an amplitude of a corresponding sonar return;

display the second sonar image on the computer screen;

re-identify the one or more targets within the second sonar image based on at least a contrast between the color value of one or more pixel coordinates of the second sonar image and a background color value of the second sonar image by identifying at least one of shape, size, color, or speed associated with one or more pixel coordinates that substantially matches one or more predetermined shapes, speeds, colors or sizes of the one or more targets;

determine a second location of the one or more targets based on the pixel coordinates of the second sonar image associated with the one or more targets; and tracking the one or more targets by at least storing the first location and the second location of the one or more targets in a memory.

12. The non-transitory computer-readable medium of claim 11, further comprising executable instructions which, when executed by a computer, further cause the computer to identify the one or more targets by summing the contrasts of a plurality of pixel coordinates that are each within a predetermined minimum area.

13. The non-transitory computer-readable medium of claim 11, further comprising executable instructions which, when executed by a computer, further cause the computer to receive the user input by receiving a selection of one or more pixel coordinates in the first sonar image.

14. An apparatus, the apparatus comprising:
one or more processors;
a computer screen; and
a memory having stored thereon a plurality of executable instructions which, when executed by the one or more processors, causes the one or more processors to:
receive first sonar data from a sonar system of a vessel at a first time, wherein the first sonar data is generated from a plurality of sonar returns from an underwater environment relative to the vessel based on a first sweep of the underwater environment by the sonar system, wherein at least one transducer of the sonar system is configured to mechanically rotate 360 degrees during the first sweep;

process the first sonar data from the first sweep to form a first sonar image that shows a representative plan view of the underwater environment relative to the vessel, wherein the first sonar image is formed using pixel coordinates for each of the plurality of sonar returns of the first sonar data, wherein each pixel coordinate defines a color value that directly correlates to at least an amplitude of a corresponding sonar return;

display a first sonar image on the computer screen;

identify one or more targets in the first sonar image by determining that a contrast between the color value of one or more pixel coordinates of the first sonar image and a background color value of the first sonar image is greater than a predetermined threshold;

receive user input to a user interface associated with the screen, wherein the user input indicates a desire to track one or more targets on the first sonar image;

determine a first location of the one or more targets based on the pixel coordinates of the first sonar image associated with the one or more targets;

receive second sonar data from the sonar system of the vessel at a second time following the first time, wherein the second sonar data is generated from a plurality of sonar returns from the underwater environment relative to the vessel based on a second sweep of the underwater environment by the sonar system, wherein the at least one transducer of the sonar system is configured to mechanically rotate 360 degrees during the second sweep;

process the second sonar data from the second sweep to form a second sonar image that shows a representative plan view of the underwater environment relative to the vessel, wherein the second sonar image is formed using pixel coordinates for each of the plurality of sonar returns of the second sonar data, wherein each pixel coordinate defines a color value that directly correlates to at least an amplitude of a corresponding sonar return;

display the second sonar image on the computer screen;

re-identify the one or more targets within the second sonar image based on at least a contrast between the color value of one or more pixel coordinates of the second sonar image and a background color value of the second sonar image by identifying at least one of shape, size, color, or speed associated with one or more pixel coordinates that substantially matches one or more predetermined shapes, speeds, colors or sizes of the one or more targets;

determine a second location of the one or more targets based on the pixel coordinates of the second sonar image associated with the one or more targets; and tracking the one or more targets by at least storing the first location and the second location of the one or more targets in the memory.

15. The apparatus of claim 14, wherein the plurality of executable instructions, when executed by the one or more processors, further cause the one or more processors to receive the user input by receiving a selection of one or more pixel coordinates in the first sonar image.

16. The apparatus of claim 14, wherein the plurality of executable instructions, when executed by the one or more processors, further cause the one or more processors to identify the one or more targets by summing the contrasts of a plurality of pixel coordinates that are each within a predetermined minimum area.

* * * * *